United States Patent [19]

Smith

[11] Patent Number: 5,288,219
[45] Date of Patent: Feb. 22, 1994

[54] AIR RING FOR CONTROLLING BLOWN FILM THICKNESS

[75] Inventor: David J. Smith, Topsfield, Mass.

[73] Assignee: Battenfeld Gloucester Engineering Co., Inc., Gloucester, Mass.

[21] Appl. No.: 674,589

[22] Filed: Mar. 25, 1991

[51] Int. Cl.⁵ .................. B29C 47/88; B29C 47/92
[52] U.S. Cl. .................. 425/72.1; 425/141; 425/143; 425/326.1
[58] Field of Search ............... 425/72.1, 325, 141, 425/326.1, 387.1, 143, 144; 264/40.1, 40.6, 566–570

[56] References Cited

U.S. PATENT DOCUMENTS

| | | | |
|---|---|---|---|
| 3,217,359 | 11/1965 | Euling | 425/326.1 |
| 3,235,632 | 2/1966 | Lemmer et al. | 425/326.1 |
| 3,835,209 | 9/1974 | Karabedian | 264/51 |
| 3,976,732 | 8/1976 | Herrington | 425/326.1 |
| 4,145,177 | 3/1979 | Schott, Jr. | 425/326.1 |
| 4,209,475 | 6/1980 | Herrington | 264/40.1 |
| 4,246,212 | 1/1920 | Upmeier et al. | 264/40.1 |
| 4,339,403 | 7/1982 | Upmeier et al. | 264/40.1 |
| 4,339,404 | 7/1982 | Upmeier et al. | 264/40.1 |
| 4,351,785 | 9/1982 | Upmeier et al. | 264/40.1 |
| 4,425,290 | 1/1984 | Upmeier | 264/40.1 |
| 4,464,318 | 8/1984 | Upmeier et al. | 264/40.1 |
| 4,750,874 | 6/1988 | Keim | 425/326.1 |
| 4,834,924 | 5/1989 | D'Annunzio et al. | 264/40.6 |

FOREIGN PATENT DOCUMENTS 0325961 8/1989 European Pat. Off. .
3627129 1/1988 Fed. Rep. of Germany ...... 425/325

Primary Examiner—Jan H. Silbaugh
Assistant Examiner—Mathieu Vargot
Attorney, Agent, or Firm—D. J. Shade

[57] ABSTRACT

Apparatus and method are described for controlling thickness of plastic films produced by the blown film process. The apparatus is an air cooling ring modified to include devices for locally modifying the temperature of the air discharged from the air ring onto the blown bubble. Local variations in the temperature of the cooling air applied to the surface of the bubble result in variations in the bubble cooling rate and viscosity, with consequent variations in thinning during transverse bubble expansion. The method includes controlling the location and extent of local temperature variation applied to the bubble in response to comparison of measured film thickness with a desired film thickness.

12 Claims, 5 Drawing Sheets

AIR RING FOR CONTROLLING BLOWN FILM THICKNESS

BACKGROUND OF THE INVENTION

1. Field of the invention

This invention comprises apparatus and method for controlling gauge uniformity in the manufacture of blown plastic film.

2. Review of the Prior Art

Production of blown plastic film by the processes of extruding molten polymer through an annular die nozzle, surrounding the extruded tube by an air cooling ring, cooling the extruded tube by discharging air from the air cooling ring onto the surface of the extruded tube, holding the extruded polymer tube closed between opposed nip rolls, inflating the closed tube between the annular die nozzle and the nip rolls to a diameter greater than that of the annular die, and drawing the polymer tube from the nozzle with the nip rolls at a rate greater than the linear rate of discharge from the annular die nozzle is well known. Uniformity of the nozzle gap, distribution of the air from the cooling ring, uniformity of temperature and attendant viscosity of the molten polymer, cleanliness and maintenance of the equipment and environmental factor in the building in which the equipment is located have all been recognized as influencing the uniformity of the gauge of the finished blown film. In view of the detrimental effects of gauge non-uniformity to subsequent processing of wound rolls of blown film, it is customary to rotate portions of the equipment, e.g. extruder, die, nip rolls and collapser, to effect a distribution of gauge non-uniformity across the roll face.

While the previously mentioned factors have long been recognized to lead to gauge non-uniformities in the finished film, numerous schemes have been proposed to deliberately adjust some of these same factors to compensate for the gauge non-uniformities or to produce a desired thickness profile. In the flat die area, both local mechanical adjustments of the die opening in response to a thickness measurement signal, U.S. Pat. Nos. 3,122,782 and 3,122,783 and direct local heating of selected portions of the die responsible for greater thickness U.S. Pat. No. 3,161,711 are known.

A series of U.S. Pat. Nos. 4,246,212; 4,339,403; 4,339,404; 4,351,785; 4,425,290; 4,464,318 extend the basic methods of mechanical deformation and/or temperature variation of the die lips to annular blown film dies. In U.S. Pat. No. 4,246,212 the outer nozzle ring of the annular die has been subdivided into a number of temperature control sectors which can be separately supplied with heated or cooled fluids to locally affect melt viscosity and the resulting film thickness.

In U.S. Pat. No. 4,339,403 the correcting sections of the nozzle ring, either mechanical or thermal, are influenced in response to the circumferential lengths of film sectors of constant cross sectional area, until such circumferential lengths are equal. The remaining patents in this series deal with methods for determining and implementing correction commands.

In European EPO 325 961 A2 blown film thickness control by means of infrared heaters arranged about the bubble circumference downstream of the die and air ring has been shown. In this method, infrared heaters, whose wavelengths must be matched to the absorption characteristics of the film being processed, are used to heat locally thick areas, thereby reducing the resistance to deformation, with the net result that the thickness uniformity following transverse expansion is improved. Use of heaters in the flat die area in cases of biaxial orientation involving reheating followed by machine direction and transverse deformation are generally known, as described in U.S. Pat. No. 3,782,873.

While the previously mentioned patents all describe variation in techniques previously used in flat die extrusion applications, U.S. Pat. No. 4,209,475 describes an apparatus and method for controlling film thickness that is unique to blown film processing. As previously indicated, in the blown film process it is customary to apply one or more stream of cooling air to the extruded tube following extrusion. In the '475 patent an air ring is described that is equipped with a large number of independently adjustable blades that can project into the discharged cooling air stream. These deflector blades, by locally inducing more or less local turbulence into the cooling air stream, will offset cooling of the extruded tube along longitudinal bands. By selectively altering the cooling rates along the longitudinal bands in response to gauge variation in the expanded film, these variations can be reduced, i.e. slower cooling of thick bands relative to adjacent thin ones results in proportionally more deformation during transverse tube expansion and consequent variation or difference in film gauge. Although this patent primarily dealt with manual actuation of the deflector blades, mention was made of a system utilizing motorized adjustment of individual blades in response to control signals from an online thickness measuring device.

SUMMARY OF THE INVENTION

A new and improved method and apparatus for automatic control of thickness variations in blown film production operations has been developed that is readily and relatively inexpensively adaptable to existing as well as new blown film manufacturing installations. In accordance with this improvement an air cooling ring conventionally used to apply one or more cooling air streams to the outside surface of a freshly extruded plastic tube is modified to include one or more cooling air temperature modification devices, said temperature modification devices arranged about the internal air flow paths of the air ring to locally modify the temperature of the cooling air applied to the extruded tube. These local variations in cooling air temperature result in local variations in bubble cooling rate and consequent variation in temperature, viscosity and draw down rate during transverse bubble expansion, with higher temperature thick areas undergoing relatively greater transverse stretching and consequent thinning than cooler areas. Modification to the cooling air temperature is made in response to online post expansion film thickness measurements corrected, if applicable, for any rotation of the film tube between the die and the measuring head, said temperature modification adjusted periodically in response to periodic film thickness measurements.

The method is applicable to both external and internal bubble cooling systems or combination of both, and to temperature modification that consist of local elevation of temperature, local reduction of temperatures, a combination of both local elevation and reduction relative to the mean cooling air temperature.

In the preferred embodiment of the invention, the local temperature variation will be temperature increase, with such temperature increase applied to thick portion of the film to reduced such thick region, and the temperature modifying means will comprise heater installed into the air ring. When heaters are used, a relatively large number of control zones can be established, the circumferential extent over which each individual heater will be active will be determined by turbulence and mixing within the air ring. Radially oriented flow straighteners, i.e. partitions in the flow path, can be used between adjacent heaters or a series of heaters to concentrate the effect and limit the circumferential extent of the effect of a single heater or a group of heaters. The air rings can be of any number of flow paths, although single flow air rings are currently preferred for high stalk extrusion processes, while double flow air rings are preferred for all others. In the case of double flow air rings, temperature modifying devices preferably will be placed in the flow path for the major cooling flow.

DESCRIPTION OF THE PREFERRED EMBODIMENT

Figure 1:
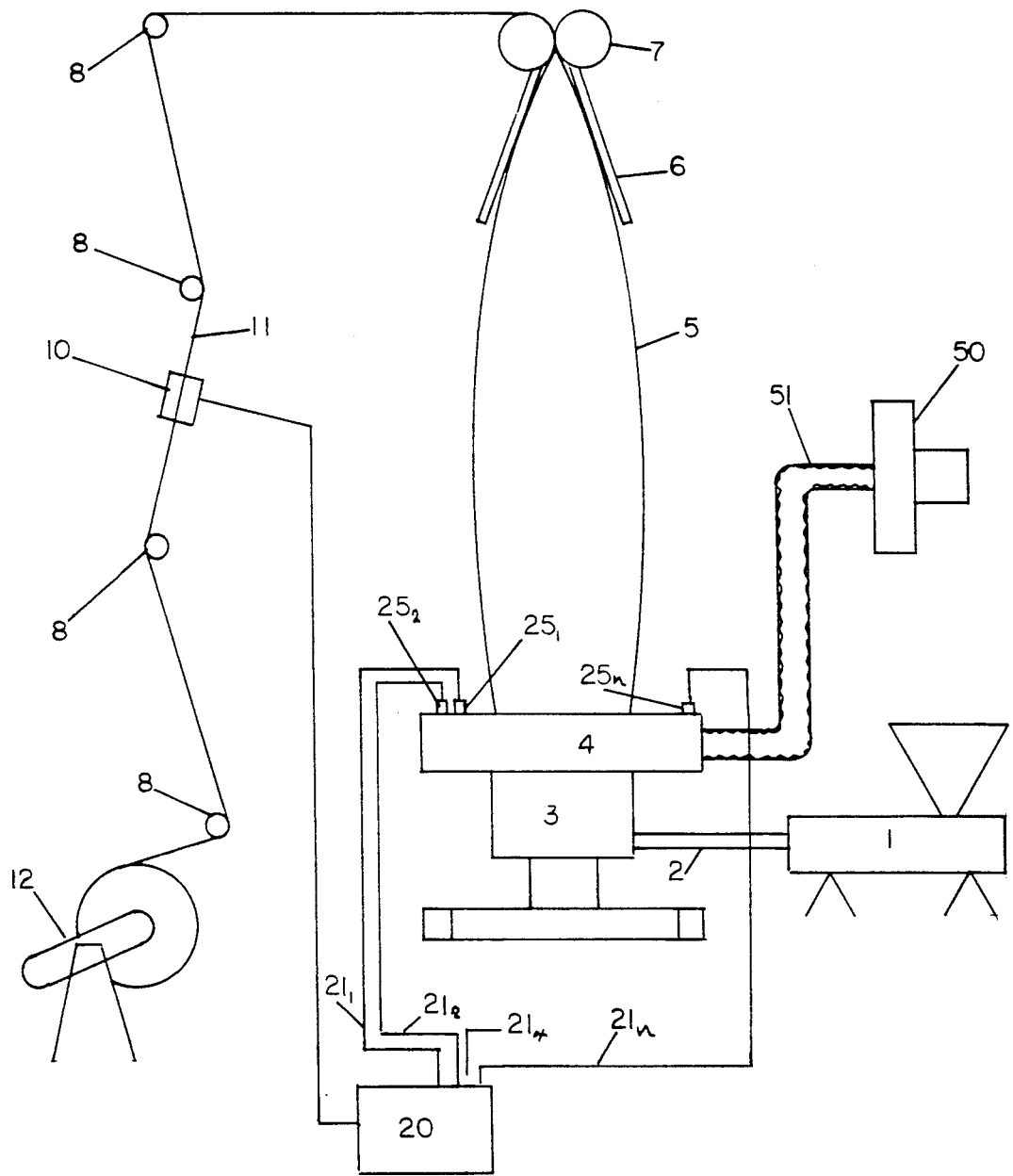
FIG. 1 is an elevation of a typical blown film machinery installation including an air ring and control means according to the present invention.

Reference is now made to FIG. 1 for an overall description of a blown film manufacturing installation. In such an installation, resin pellets are fed into the inlet of extruder 1, where, under the influence of heat and mechanical working, they will be melted. From extruder 1 the melted plastic passes through adapter 2 to annular die 3, where it is extruded through an annular nozzle to form tubular web 5. Adjacent to die 3 there is an air cooling ring 4, that is used to apply cooling and gauge control air to the exterior surface of the extruded tube. The tube is inflated with air to produce an inflated tube diameter significantly greater than the diameter of the annular nozzle. This diameter increase is referred to as transverse expansion or transverse drawdown. The tube is extended upwardly toward nip rolls 7, which are used to define the upper closed end of the bubble and to draw the extruded web 5 from the die to thereby axially thin the web and to introduce machine direction orientation.

There are a series of collapsing devices 6, e.g. plates, slats, or a series of rollers, beneath nip roll pair 7, that are used to flatten the bubble from its round shape at the die to that of double layer flat sheet at the nip roll pair.

From the nip roll pair the now flattened web is brought to a roll winding device 12 over a series of idler rollers 8. As will be well known to those skilled in the art, it is customary in the production of blown film to rotate either the die, the die and extruder, or the collapser and nip roll, so as to distribute gauge variations over the width of the roll being wound on winding device 12. So long as any such device is used that rotates a minimum of ±180 degrees from its zero position, i.e. at least 360 degrees in total, a thickness gauge of any conventional type, e.g. infrared or nuclear, positioned at the web edge and measuring through two thicknesses of films, will provide an accurate profile of gauge variations across the web. As the die, etc. is rotating and the measuring gauge is both stationary and a significant distance from the die, helical twist in the bubble must be accounted for in assigning a measured thickness to a specific position at the air ring.

Thickness measurements from gauge 10 are transmitted over circuit 11 to processor 20. Also transmitted to processor 20 is a rotation signal that is used by the processor for identifying a reference position. Processor 20 takes the thickness data from gauge 10 and internally generates a circumferential thickness profile for web 5 which is then compared to a desired profile. In response to deviations from the desired thickness profile, processor 20 will calculate an appropriate correction signal or signals assigned to a particular circumferential position on air ring 4, and transmit that signal to the appropriate temperature modification device 25.

Figure 2:
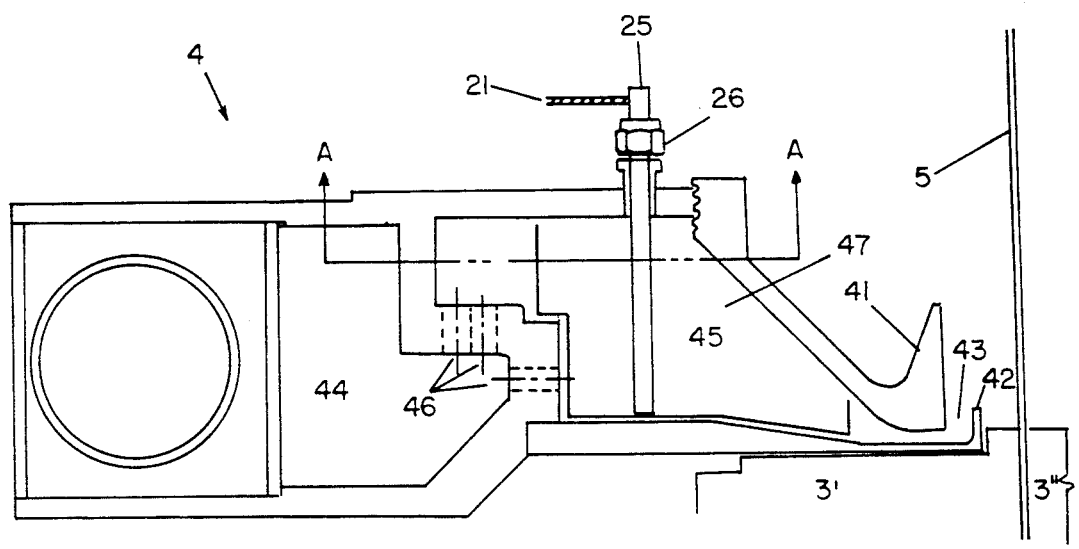
FIG. 2 is a radial cross section through a single flow air ring according to the present invention.

FIG. 2 shows a single flow air ring according to the present invention. A single flow air ring of the type shown in this FIG. 2 would be used in a high stalk extrusion process, typically one for processing high density polyethylene resin. Air from blower 50 (not shown in FIG. 2) flows through air supply hose 51 (not shown in FIG. 2) through air ring inlet port 40 into inlet plenum 44. From the inlet plenum 44 air will pass through transfer ports 46 into outlet plenum 45. Transfer ports 46 serve to alter the tangentially oriented incoming flow direction in outer plenum 44 into an essentially radially oriented flow in outlet flow path 45. Air flow continues essentially radially, until discharged essentially parallel to web 5 through annular gap 43 found between air ring outer lip 41 and inner lip 42.

Inserted into outlet flow path 45 is temperature control element 25. Although temperature modification device 25 could be a mixing nozzle supplied with intensely chilled air or heated air, so that the temperature of the discharged air could be either lowered or raised, or an externally heated device, the currently preferred temperature modification device 25 is an electrical cartridge heater. Temperature modification device 25 can be inserted into outlet flow path 45 through an opening in the air ring structure, and held in position and sealed against air leakage by use of a tube fitting 26. Provision should be made in the design of device 25 so that the portion of device 25 held within fitting 26 is not heated. Generally, electrical cartridge heaters having an output of approximately 100 watts per inch of active length at 240 volts have proved satisfactory as the temperature modification device.

As previously indicated, tangential air flow in inlet plenum 44 is converted to essentially radial air flow by transfer ports 46. However, it has been found desirable to include radially oriented partitions 47 between adjacent devices 25 to reduce the circumferential extent of the temperature modified cooling air stream. The partitions may be located between each adjacent element 25, or may be located between element 25 periodically, e.g. one partition every three temperature modifying devices.

Figure 3:
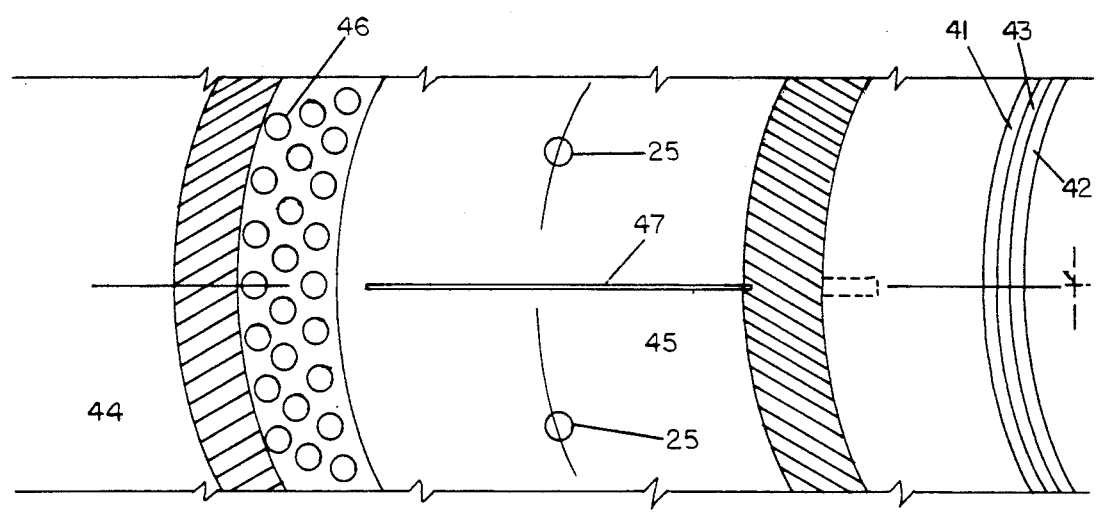
FIG. 3 is a section along A—A of FIG. 2 showing the orientation of the internal deflectors and temperature altering means.

The orientation of partition 47 relative to the die lip and adjacent temperature modification devices 25 is shown in FIG. 3. Partition 47 extends radially inwardly to approach annular gap 43. The purpose in extending this partition to approach annular gap 43 is to minimize the distance over which mixing of air flows from adjacent cells may occur.

Figure 4:
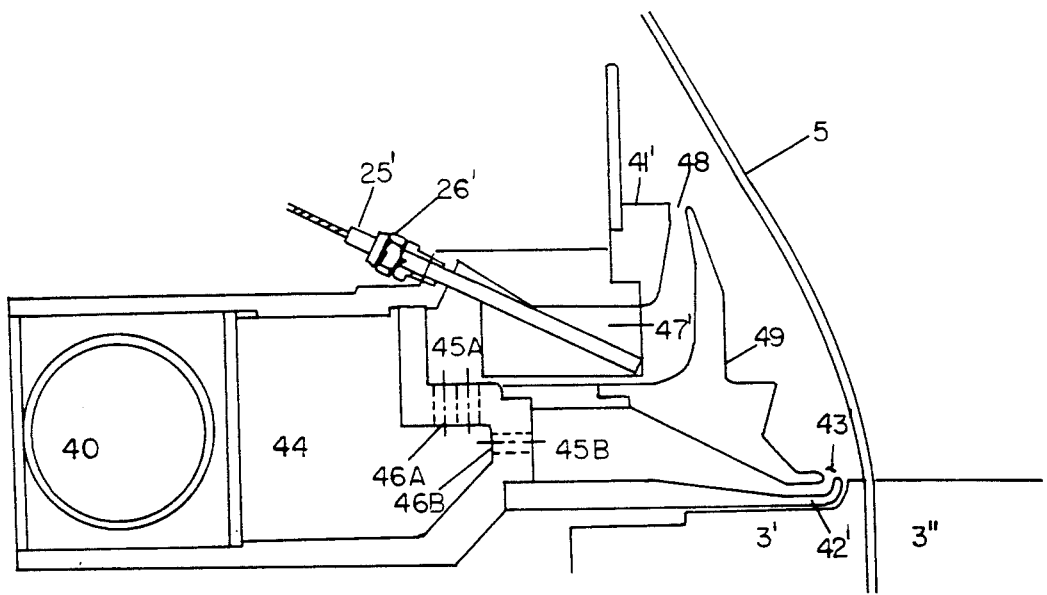
FIG. 4 is a radial cross section through a dual flow air ring.

A dual flow air ring suitable for blown film extrusion of low density polyethylene resin, linear low density polyethylene resin, and blends thereof and containing temperature modification devices 25' is shown in FIG. 4. Up to transfer ports 46a and 46b, this air ring is identical in structure to that shown in FIG. 2. Transfer port 46b passes air from inlet plenum 44 to lower gap outlet flow path 45b, while transfer ports 46a pass air from inlet plenum 44 to upper gap outlet flow path 45a. As is customary with dual flow air rings, the bulk of the cooling air is discharged from the upper gap, so that temperature modification devices 25' are located in the upper gap outlet plenum 45a. Partitions 47' are placed between adjacent control elements 25' to minimize the circumferential extent of any cooling air temperature corrections.

The number of temperature modifying devices 25 used in a particular air ring will depend on numerous factors including air ring size, capacity of the individual temperature modifying devices 25, and the capacity of the processor. For instance, 60 individual temperature modifying devices, each individually controlled by processor 20 are preferred for an air ring used in conjunction with a 9" diameter die. Four temperature modifying devices 25, each serving a quarter of this circumference, would seem to be the smallest practical number of elements from which effective control could be expected.

In blown film production the apparatus of the present invention will be used as follows: A film bubble 5 is formed by extrusion through annular die 3. Cooling air is applied to the external surface of bubble 5 through air cooling ring 4. Bubble 5 is collapsed and pulled away from die 3 by nip rolls 7 and collapsing roll 6. The now flattened tube is lead over a series of idler rolls 8 to a winder 12. Interspersed along the path of travel is film thickness gauge 10, which will periodically be used to measure film gauge along the full circumference of the flattened film.

Output from film thickness gauge 10 will be transmitted along conduit 11 to processor 20. At processor 20 appropriate corrections are made to the thickness signals from thickness gauge 10 to correct for rotation of bubble 5 between air ring 4 and thickness gauge 10, so that all thickness measurements are related back to a particular air ring 4 location. A corrective signal is then sent to the appropriate temperature modifying device 25 or devices along conduit 21, locally altering the temperature of the discharged cooling air. Local alteration of the discharged cooling air results is local variation in cooling rate of web 5. These variations in cooling rate result in non-uniform transverse drawdown, i.e. thinning, of web 5. When temperature modifying devices 25 are heaters, locally warmed air would be applied to thicker than desired areas, resulting in slower cooling of the thick areas during transverse expansion and greater thinning relative to more rapidly cooled areas. If the local temperature modifications were a cooling, the cooler air would be applied to the areas to reduce the extent of thinning during transverse drawdown. Thickness measurements are made regularly, and new correction signals are made based on these measurements. These new correction signals are in turn applied to temperature modifying device 25, and the measuring/correcting cycle continues on an iteritive basis.

Figure 5:
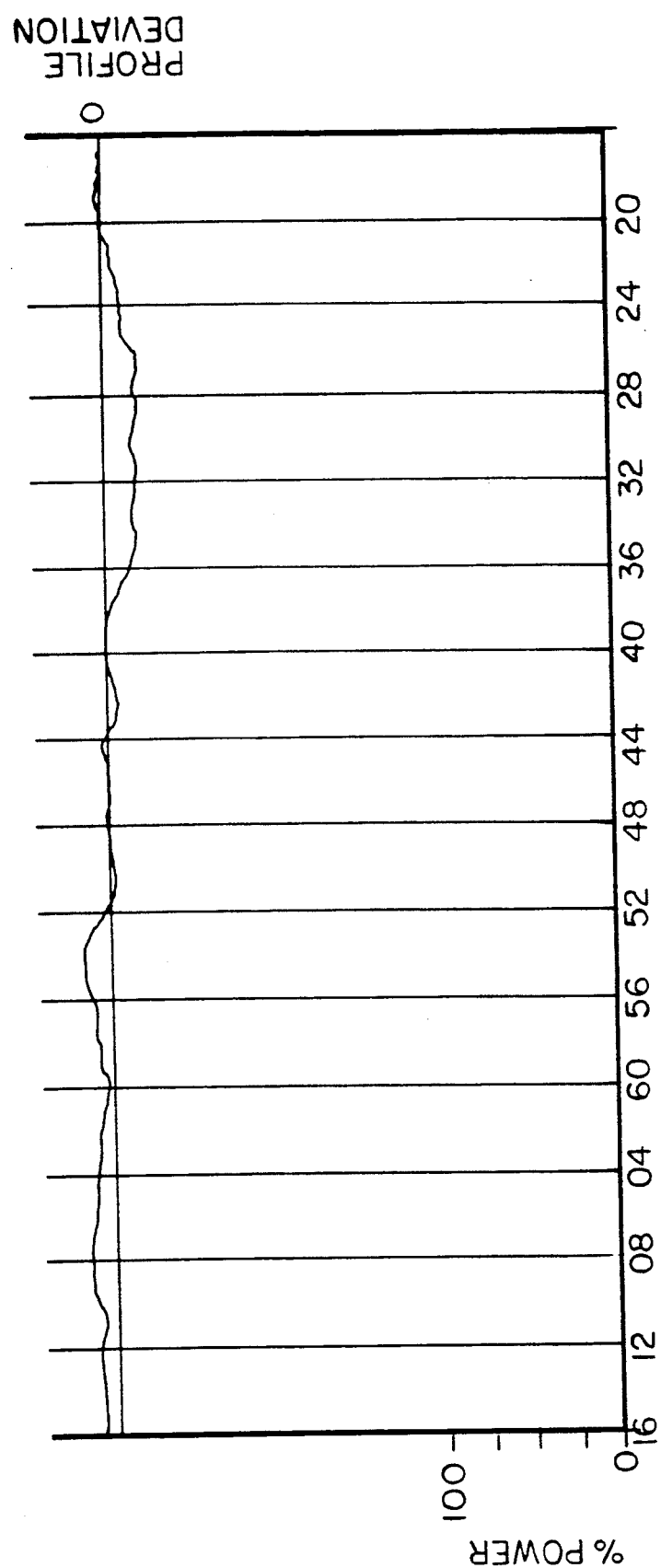
FIG. 5 is a representative profile of film thickness prior to any correction.

Following startup of a blown film line but prior to any attempts at gauge correction, the circumferential gauge distribution may appear as shown in the upper portion of FIG. 5. In FIG. 5 the numbers along the horizontal axis of the figure represent the individual temperature correcting elements, while the solid line indicates film thickness at the location indicated. It should be noted that, as shown in FIG. 5, the air ring is equipped with 60 individual correction elements. Further, the film over elements 1 to 30 was generally thin, while the film was generally thick over elements 31 to 60.

Figure 6:
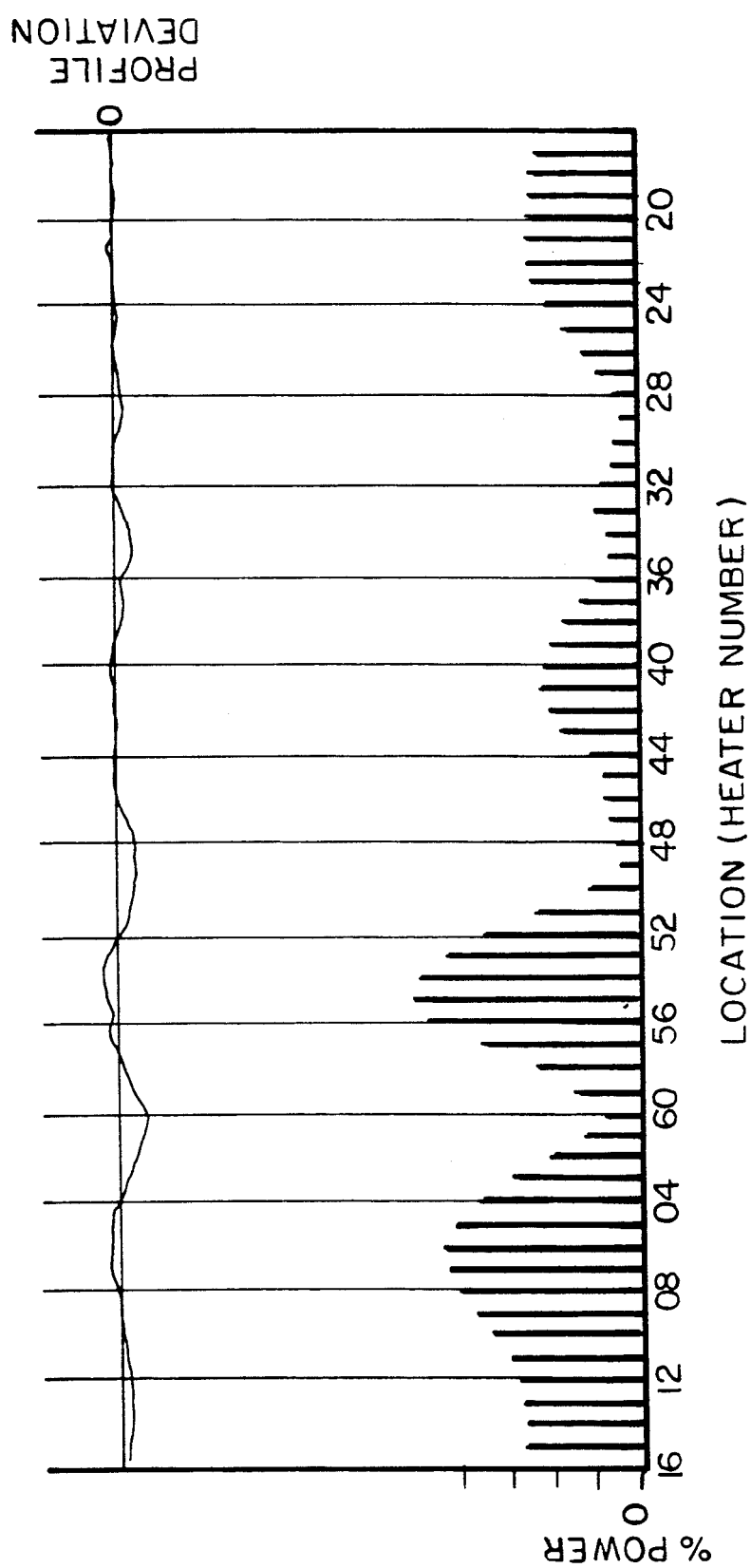
FIG. 6 is a representative profile of film thickness and correction signal for the same condition as FIG. 6.

The gauge control system was then turned on, and after approximately 30 minutes, the results shown in FIG. 6 were obtained. In FIG. 6 the upper graph again represents a trace of film gauge versus circumferential position at the air ring, while the lower plot represents the percentage of power applied to each control element. Comparison of FIG. 5 with the upper portion of FIG. 6 shows the magnitude of the gauge variation has been substantially, i.e. greater than 50%, reduced. The lower part of FIG. 7, i.e. the bar diagram, shows the percentage of available heating power applied to each correcting element.

The foregoing description has described the preferred embodiment of the present invention and has described its method of operation. Variations and modifications may be made without departing from the principle of the invention. It is intended that all variation and modification fall within the scope of the following claims.

I claim:

1. An air ring for controlling gauge of blown plastic film comprising:
  a) a generally annular plenum;
  b) an annular orifice for discharging cooling air against an extruded plastic tube passing through the air ring;
  c) a flow path for cooling air between said plenum and said annular orifice;
  d) an electrical cartridge heater inserted in said air flow path; whereby the temperature of cooling air discharge against said extruded plastic tube can be locally varied.

2. An air ring according to claim 1 further comprising a plurality of electrical cartridge heaters inserted in said air flow path.

3. An air ring according to claim 2 further comprising a radially oriented partition located in the flow path between any two electrical cartridge heaters.

4. An air ring according to claim 3 further comprising a plurality of radially oriented partitions located in said flow path, each of said partitions located between two cartridge heaters.

5. An air ring according to claim 4 wherein said partitions are located at regular intervals with respect to the electrical cartridge heaters.

6. An air ring according to claim 5 wherein the number of electrical cartridge heaters is 4 or greater.

7. An air ring according to claim 6 where the number of electrical cartridge heaters is at least 60.

8. An air ring according to claim 7 where the number of partitions equals the number of electrical cartridge heaters.

9. In a system for producing blown plastic film, including an extruder, an annular die, and an air ring for discharging cooling air on an extruded plastic tube, a thickness measurement system, and a nip roll assembly, the improvement which comprises an air ring equipped with a plurality of electrical cartridge heaters for locally altering the temperature of cooling air discharged from the air ring onto the extruded plastic tube in response to film thickness measurements from said thickness measurement system, whereby the thickness of the resulting film can be locally altered.

10. The apparatus of claim 9 further comprising a radially oriented partition located in an air flow path between any two adjacent electrical cartridge heaters for locally altering the temperature of cooling air.

11. The apparatus of claim 10 further comprising a plurality of partitions in the air flow path arranged between electrical cartridge heaters for locally altering the temperature of cooling air on a periodic basis.

12. The apparatus of claim 11 wherein said air ring is a dual flow air ring and said electrical cartridge heaters act upon a larger volumetric flow.

* * * * *